Dec. 2, 1947.                B. CARLIN                    2,431,862
                   MEANS FOR SUPERSONIC INSPECTION
                       Filed March 26, 1946
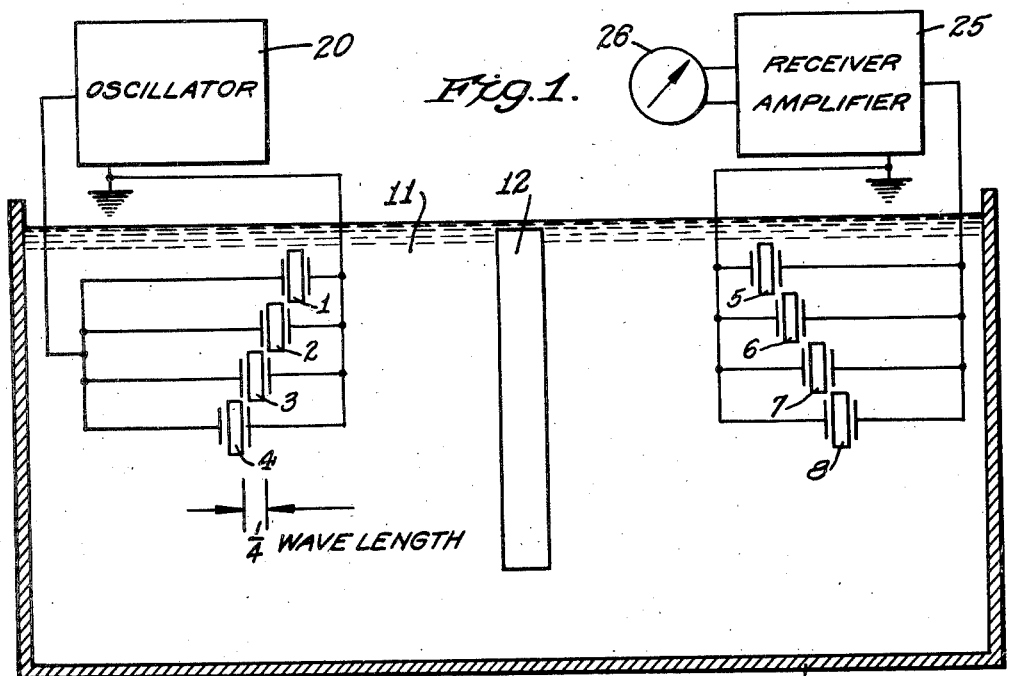
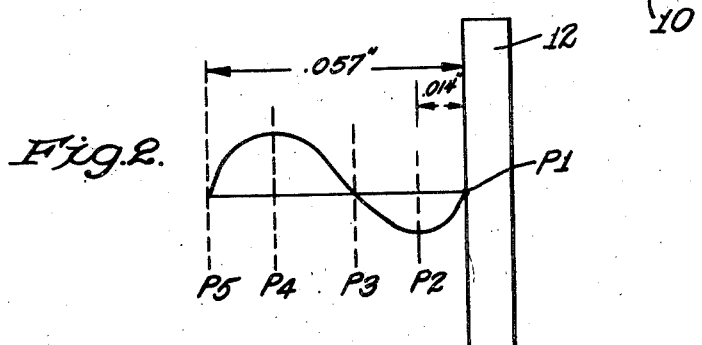
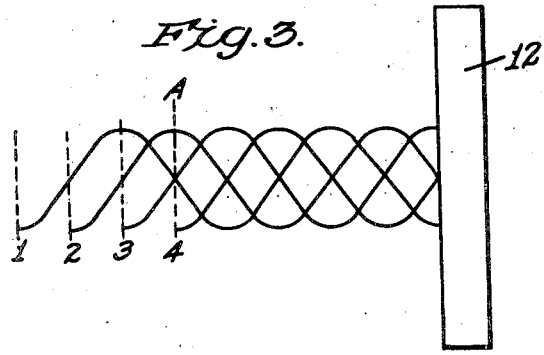
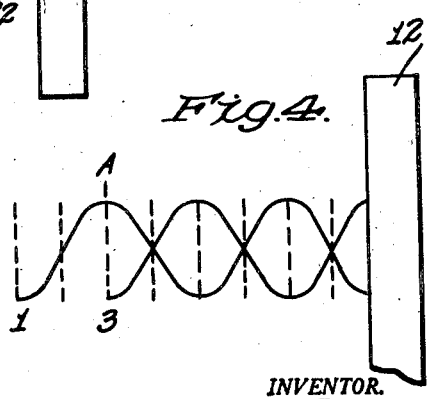
INVENTOR.
BENSON CARLIN
BY
Joseph H. Lipschutz
ATTORNEY Patented Dec. 2, 1947

2,431,862

UNITED STATES PATENT OFFICE 2,431,862

MEANS FOR SUPERSONIC INSPECTION

Benson Carlin, New York, N. Y., assignor to Sperry Products, Inc., Hoboken, N. J., a corporation of New York Application March 26, 1946, Serial No. 657,305

7 Claims. (Cl. 73—67)

1

This invention relates to a problem which is inherent in the use of continuous waves in supersonic apparatus. Wherever supersonic waves are transmitted continuously through a fluid medium into engagement with a reflecting surface, these waves will reflect back and forth between the transmitter and the reflecting surface and set up a standing wave of considerable relative power. This standing wave will transmit power to the object which it strikes to a varying degree depending upon the position of the object with respect to the component parts of a cycle of the standing wave. Thus, for instance, if the object happens to be positioned at a node in a cycle of the standing wave substantially little or no energy will be transmitted to the object by the standing wave. However, should the object change its position with respect to a cycle of the standing wave by as much as one-fourth of the wave length of the cycle, the object will be in the position where the maximum energy of the standing wave will be transmitted to the object. When it is considered that the waves employed in supersonic continuous wave apparatus have a length on the order of perhaps .057" it will be realized that one-fourth of the wave length is only .014" so that a variation in position of the object of only .014" will yield a variation of energy input caused by the standing wave from zero to maximum.

The above condition is particularly detrimental in the process of utilizing continuous supersonic waves for the testing of an object, in which case a supersonic wave of predetermined characteristic is transmitted to the object and the amount of energy transmitted by the object to a receiver is a measure of the characteristics of the object. In this testing process it is assumed that any variations in the amount of energy received from the object are due to defects within the object, and this would be the case were it not for the existence of the standing wave described above. From the above description it can be seen that a slight variation in the position of the object will result in a variation in energy output from the object which may be as great as the energy variation caused by a defect within the object. Thus, unless the effect of the standing wave can be substantially eliminated, the continuous supersonic wave method of testing will remain impractical.

It is one of the principal objects of this invention to provide means for substantially eliminating the effect of standing waves in the use of

2 continuous supersonic waves and particularly in the use of these waves for testing objects.

Further objects and advantages of this invention will become apparent in the following detailed description thereof.

In the accompanying drawings,

Fig. 1 is a vertical section through a tank containing a fluid and showing, largely diagrammatically, one embodiment of the principle of this invention.

Fig. 2 is a diagrammatic representation of the problem inherent in continuous wave testing.

Fig. 3 is a diagrammatic representation of the principle embodied in this invention.

Fig. 4 is a view similar to Fig. 3 showing the principle of the invention applied to a modified form.

I have disclosed my invention as applied to the problem of testing objects by means of continuous supersonic waves adapted to be passed through a fluid medium. As shown, the device is mounted within a tank 10 filled with fluid 11 within which is suitably supported, by means not shown, the object 12 which is to be tested. The test consists in transmitting to the object at one side thereof continuous supersonic waves representing a given energy level and receiving the waves transmitted through the object. A sound object will yield a predetermined level of received energy whereas a defective object will result in a different, and usually lower, level of energy. For transmitting the continuous supersonic waves through the fluid 11 into engagement with the object 12 there may be provided a piezo-electric element or elements, here shown as a plurality of such elements 1, 2, 3 and 4 which may be energized continuously from a suitable source of continuous energization such as an oscillator 20 designed to oscillate at the required frequency. The piezo-electric elements 1, 2, 3 and 4 will be oscillated at this frequency and will convert the electric oscillations into mechanical oscillations which will travel through the fluid into engagement with the object 12 to vibrate the same at the transmitted frequencies. The object 12 will transmit these frequencies to receiver elements which may be in the form of piezo-electric elements 5, 6, 7 and 8 connected electrically in parallel so that the sum of their outputs is sent into a receiver amplifier 25 whose output may actuate any suitable indicator in the form of a meter 26, oscilloscope or other indicating device.

The problem which is sought to avoid is illustrated diagrammatically in Fig. 2. The reflections of the transmitted waves between the piezo-electric elements 1 to 4 and the object will set up standing waves. One cycle of the standing wave immediately adjacent the object 12 is shown in Fig. 2. The length of one cycle in the range of frequencies transmitted may be on the order of .057", and ¼ of this cycle representing the distance from a node point to a peak will be therefore on the order of .014". If the object 12 happens to be at a node point such as P1 the standing wave will transmit substantially no energy to the object 12, but a variation in position of object 12 of only a few thousandths of an inch will cause the standing wave to impart anywhere from zero energy at P1 to maximum energy at P2, and this energy transmitted by the standing wave introduces a variation in the energy delivered to object 12 and transmitted by the object to the receiving crystals which may be of the same order as the variations caused by a defect within the object. Since it is impossible to prevent variations in position of object 12 to the extent of a few thousandths of an inch which represents the variation in standing wave error from zero to maximum, it has heretofore been found that the standing wave rendered this method of testing impractical where a single transmitting crystal and a single receiving crystal were employed.

The solution to the problem of substantially eliminating the effect of the standing wave is illustrated in Fig. 1 and diagrammatically in Figs. 3 and 4. Thus in Fig. 1, I have shown that instead of a single crystal, I employ a series of crystals and position these crystals relative to each other in a special manner designed to result in the substantial elimination of the standing wave effect. Thus, in the Fig. 1 form where I illustrate four transmitting crystals, I offset these crystals in the direction of wave transmission normal to a surface of the object under test by ¼ of the length of a wave of the type being transmitted. The result is as shown in Fig. 3 where after a steady state is achieved at position A it will be seen that at all points between position A and the object 12 the amount of energy, in any plane normal to the direction of wave propagation, in a plus direction is exactly equal to the amount of energy in a negative direction and the sum total of the energy of the standing wave is substantially zero.

The same effect can be obtained by the use of a different number of transmitting crystals. Thus, for example, if two crystals are employed they are displaced ½ wave length instead of ¼ wave length and as shown in Fig. 4 after a steady state is achieved at position A, the sum total of the energy of the standing wave consisting of the transmission and reflection of the waves will at all times be substantially zero between position A and the object 12. Any number of crystals may be employed and the general rule may be applied that the fraction of a wave length of relative displacement of the crystals in the direction of transmission is the inverse of the number of crystals. Thus, if three transmitting crystals are employed, they are displaced ⅓ wave length.

Similarly, standing waves are set up by the reflection of the waves which are transmitted from object 12 to the receiver crystal. The same solution may be applied on the receiving side as on the transmitting side, i. e., a plurality of receiving crystals may be employed displaced in the direction of travel of the waves by a fraction of a wave length which is the inverse of the number of crystals employed. Thus, as shown in Fig. 1 where four crystals are employed these are displaced ¼ wave length. While the outputs of the receiving crystals 5 to 8 inclusive have been shown as connected in parallel to a single receiver amplifier, each of these crystals may be connected to an individual input channel of the amplifier and the outputs of the separate channels summed up in the detector tube in the usual manner. Similarly, while the transmitting crystals 1 to 4 have been shown as connected in parallel and energized from a single source of oscillation, each of these crystals may be connected to a separate source of oscillation.

The foregoing description of the invention is merely illustrative and changes may be made within the scope of the appended claims.

Having described my invention, what I claim and desire to secure by Letters Patent is:

1. In a device for the supersonic testing of an object in a fluid medium, means for transmitting continuous supersonic waves through the medium into engagement with the object, means for receiving the waves transmitted by the object, and means for substantially eliminating the effect of standing waves set up by reflections between the transmitting means and the object, said last-named means comprising said transmitting means which includes a plurality of transmitters, and means whereby said transmitters generate waves of the same wave length and frequency, said transmitters being arranged in out-of-phase relation.

2. In a device for the supersonic testing of an object in a fluid medium, means for transmitting continuous supersonic waves through the medium into engagement with the object, means for receiving the waves transmitted by the object, and means for substantially eliminating the effect of standing waves set up by reflections between the transmitting means and the object, said last-named means comprising said transmitting means which includes a plurality of transmitters, and means whereby said transmitters generate waves of the same wave length and frequency, said transmitters being successively displaced in the direction of wave transmission by a fraction of the length of a standing wave.

3. In a device for the supersonic testing of an object in a fluid medium, means for transmitting continuous supersonic waves through the medium into engagement with the object, means for receiving the waves transmitted by the object, and means for substantially eliminating the effect of standing waves set up by reflections between the transmitting means and the object, said last-named means comprising said transmitting means which includes a plurality of transmitters, and means whereby said transmitters generate waves of the same wave length and frequency, said transmitters being successively displaced in the direction of wave transmission by a fraction of the length of a standing wave equal to the inverse of the number of transmitters.

4. In a device for the supersonic testing of an object in a fluid medium, means for transmitting continuous supersonic waves through the medium into engagement with the object, means for receiving the waves transmitted by the object, and means for substantially eliminating the effect of standing waves set up by reflections between the object and the receiving means, said last-named means comprising said receiving means which includes a plurality of receivers, said receivers being successively displaced in the direction of wave transmission by a fraction of the length of a standing wave.

5. In a device for the supersonic testing of an object in a fluid medium, means for transmitting continuous supersonic waves through the medium into engagement with the object, means for receiving the waves transmitted by the object, and means for substantially eliminating the effect of standing waves set up by reflections between the object and the receiving means, said last-named means comprising said receiving means which includes a plurality of receivers, said receivers being successively displaced in the direction of wave transmission by a fraction of the length of a standing wave equal to the inverse of the number of receivers.

6. In a device for the supersonic testing of an object in a fluid medium, means for transmitting continuous supersonic waves through the medium into engagement with the object, means for receiving the waves transmitted by the object, and means for substantially eliminating the effect of standing waves set up by reflections between the transmitting means and the object, said last-named means comprising said transmitting means which includes a plurality of transmitters, and means whereby said transmitters generate waves of the same wave length and frequency, said transmitters being arranged in out-of-phase relation, and means for substantially eliminating the effect of standing waves set up by reflections between the object and the receiving means, said last-named means comprising said receiving means which includes a plurality of receivers, said receivers being displaced in the direction of wave transmission by a fraction of the length of a standing wave.

7. In a device for the supersonic testing of an object in a fluid medium, means for transmitting continuous supersonic waves through the medium into engagement with the object, means for receiving the waves transmitted by the object, and means for substantially eliminating the effect of standing waves set up by reflections between the transmitting means and the object, said last-named means comprising said transmitting means which includes a plurality of transmitters, and means whereby said transmitters generate waves of the same wave length and frequency, said transmitters being successively displaced in the direction of wave transmission by a fraction of the length of a standing wave equal to the inverse of the number of transmitters, and means for substantially eliminating the effect of standing waves set up by reflections between the object and the receiving means, said last-named means comprising said receiving means which includes a plurality of receivers, said receivers being successively displaced in the direction of wave transmission by a fraction of the length of a standing wave equal to the inverse of the number of receivers.

BENSON CARLIN.

REFERENCES CITED

The following references are of record in the file of this patent:

UNITED STATES PATENTS

| Number | Name | Date |
| --- | --- | --- |
| 1,899,970 | McCollum | Mar. 7, 1933 |
| 2,043,416 | Lueg | June 9, 1936 |
| 2,063,820 | McHenry | Dec. 8, 1936 |
| 2,291,555 | Nyquist | July 28, 1942 |